(12) United States Patent
Özdemir et al.

(10) Patent No.: US 11,454,522 B2
(45) Date of Patent: Sep. 27, 2022

(54) SYSTEM TO BE COUPLED TO A CARDAN SHAFT, RELATED CARDAN SHAFT AND OPERATION METHOD OF SAID SYSTEM

(71) Applicant: TIRSAN KARDAN SANAYI VE TICARET ANONIM SIRKETI, Manisa (TR)

(72) Inventors: Serhan Özdemir, Izmir (TR); Sedat Tarakçi, Manisa (TR); Onur Sen, Manisa (TR)

( * ) Notice: Subject to any disclaimer, the term of this patent is extended or adjusted under 35 U.S.C. 154(b) by 318 days.

(21) Appl. No.: 16/771,309

(22) PCT Filed: Jun. 11, 2019

(86) PCT No.: PCT/TR2019/050427
§ 371 (c)(1),
(2) Date: Jun. 10, 2020

(87) PCT Pub. No.: WO2020/009678
PCT Pub. Date: Jan. 9, 2020

(65) Prior Publication Data
US 2021/0180995 A1  Jun. 17, 2021

(30) Foreign Application Priority Data

Jun. 12, 2018 (TR) ................................. 2018/08426

(51) Int. Cl.
*G01D 5/241* (2006.01)
*B60K 17/22* (2006.01)
(Continued)

(52) U.S. Cl.
CPC .......... *G01D 5/2417* (2013.01); *B60K 17/22* (2013.01); *F16C 3/03* (2013.01); *F16C 41/007* (2013.01);
(Continued)

(58) Field of Classification Search
CPC .......... G01D 5/2417; B60K 17/22; F16C 3/03; F16C 41/007; F16C 2326/06;
(Continued)

(56) References Cited

U.S. PATENT DOCUMENTS

| 2004/0157670 A1* | 8/2004 | Lyon | ........................ F16C 3/02 464/183 |
| 2010/0037527 A1* | 2/2010 | Boehen | ............... F16H 25/2015 49/341 |
| 2017/0190359 A1* | 7/2017 | Hong | ................. B62D 15/0225 |

FOREIGN PATENT DOCUMENTS

| CN | 04949652 B | 9/2015 |
| FR | 2715468 A1 | 7/1995 |
| KR | 20080051535 A | 6/2008 |

OTHER PUBLICATIONS

International Search Report for corresponding PCT/TR2019/050427.
Written Opinion of the ISA for corresponding PCT/TR2019/050427.

* cited by examiner

*Primary Examiner* — Omeed Alizada
(74) *Attorney, Agent, or Firm* — Egbert, McDaniel & Swartz, PLLC

(57) ABSTRACT

A cardan shaft slip distance change detection system for determining the amount of length change of the cardan shaft, including a moveable element and a stationary element associated with a telescopic approach to compensate for the change of distance caused by the vehicle's axle movements. At least two conductive elements are configured as one of them connected to a fixed point, another to the moveable element. A power element is provided to supply power to at least one of the conductive elements. A detection unit measures the electrical value change provided by the electrical interaction between the conductive elements and cor- (Continued)

relating it with the distance between the conductive elements.

15 Claims, 18 Drawing Sheets

(51) Int. Cl.
*F16C 3/03* (2006.01)
*F16C 41/00* (2006.01)
*F16D 3/06* (2006.01)
*F16D 3/38* (2006.01)

(52) U.S. Cl.
CPC .......... *F16D 3/06* (2013.01); *B60Y 2400/301* (2013.01); *F16C 2326/06* (2013.01); *F16C 2361/41* (2013.01); *F16D 3/387* (2013.01); *F16D 2300/18* (2013.01)

(58) Field of Classification Search
CPC ...... F16C 2361/41; F16C 41/002; F16C 3/02; F16D 3/06; F16D 3/387; F16D 2300/18; F16D 3/16; B60Y 2400/301
See application file for complete search history.

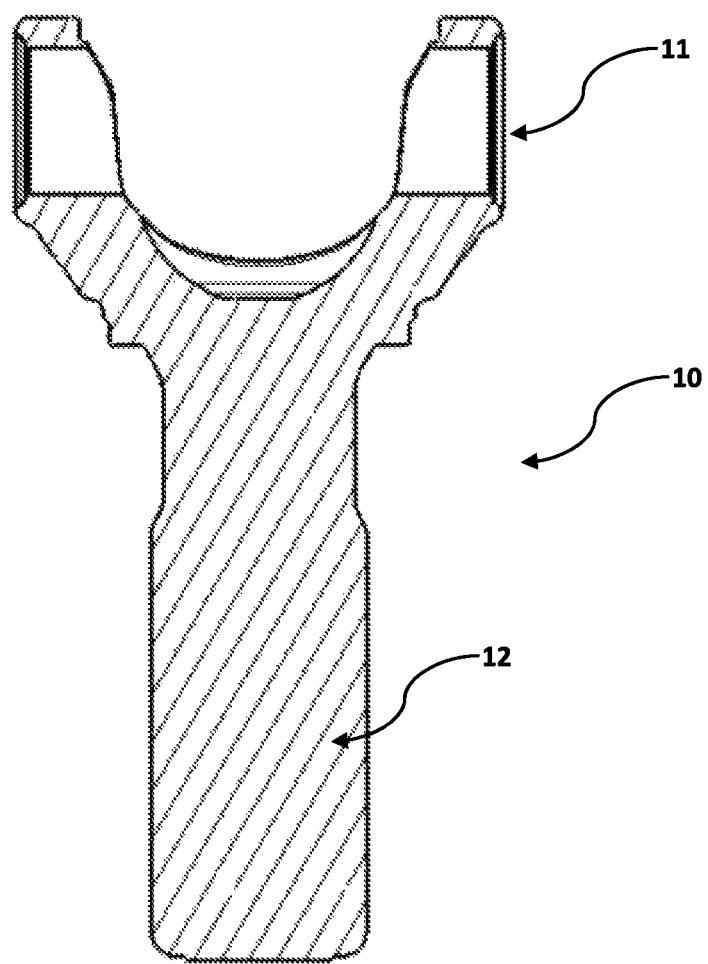
Figure 1.A

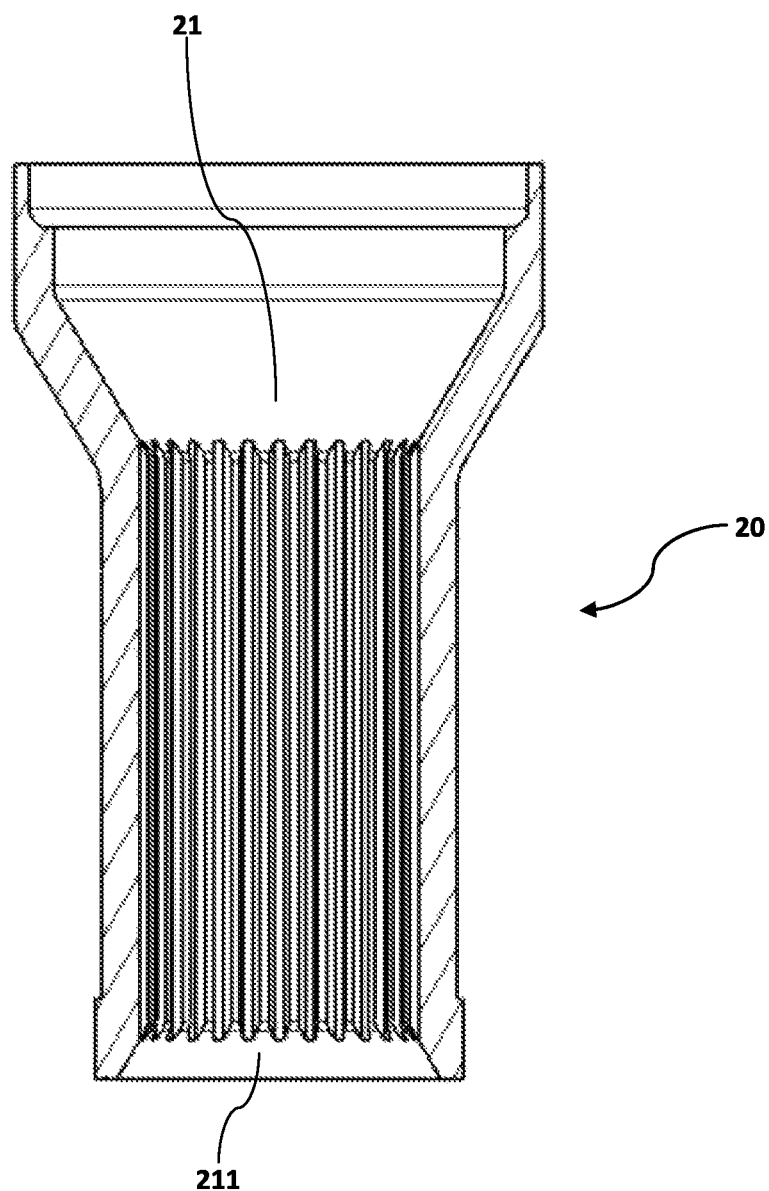
Figure 1.B

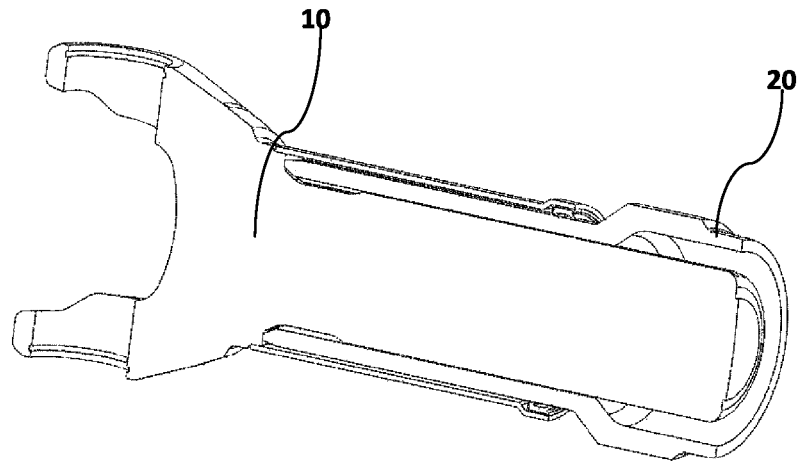
Figure 1.C
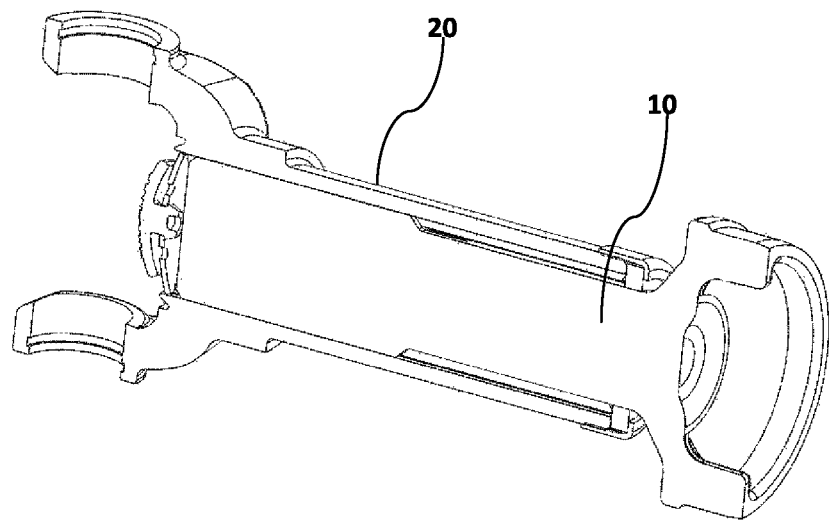
Figure 1.D

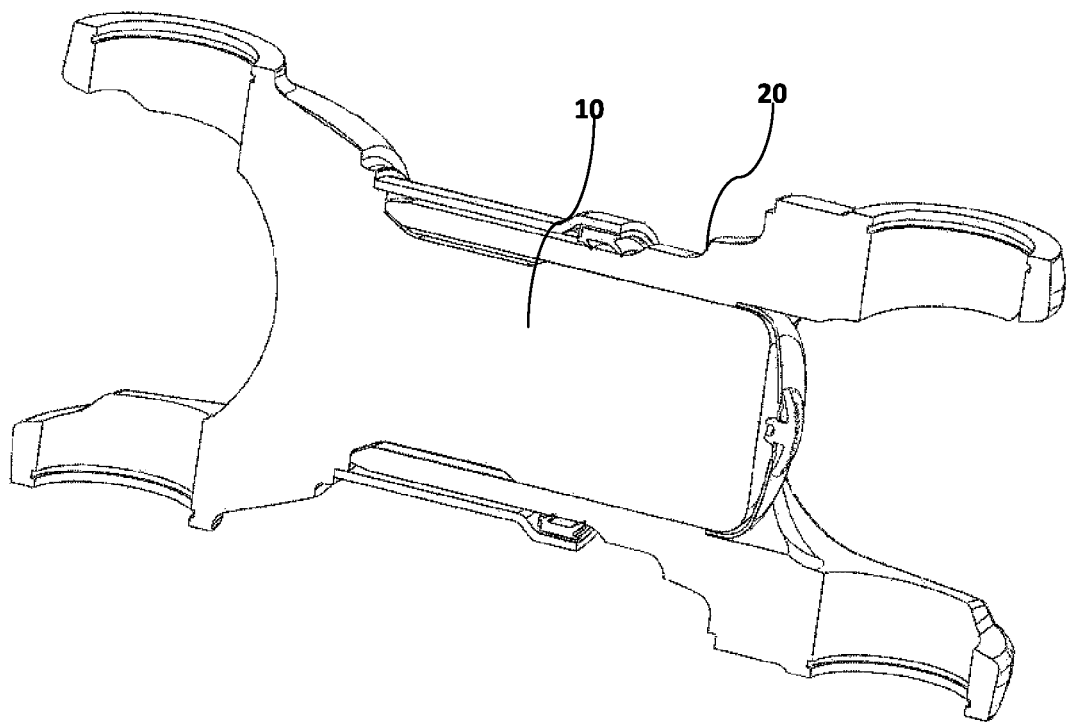
Figure 1.E

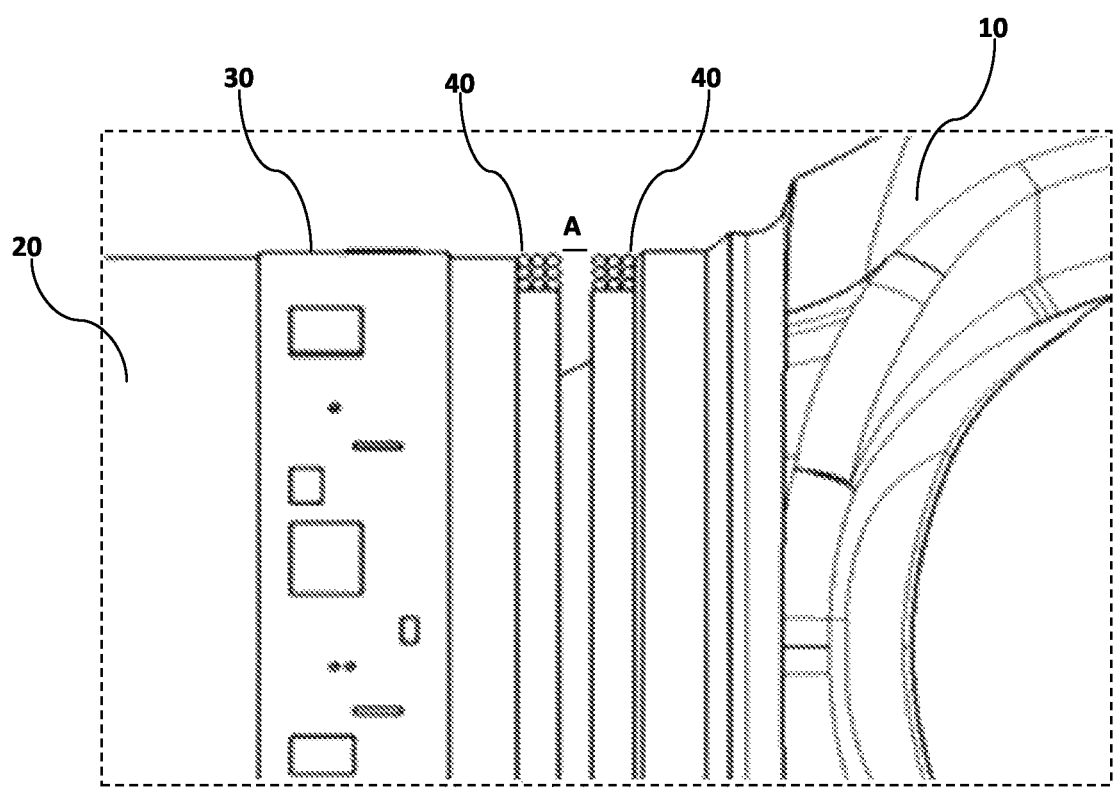
Figure 2.A

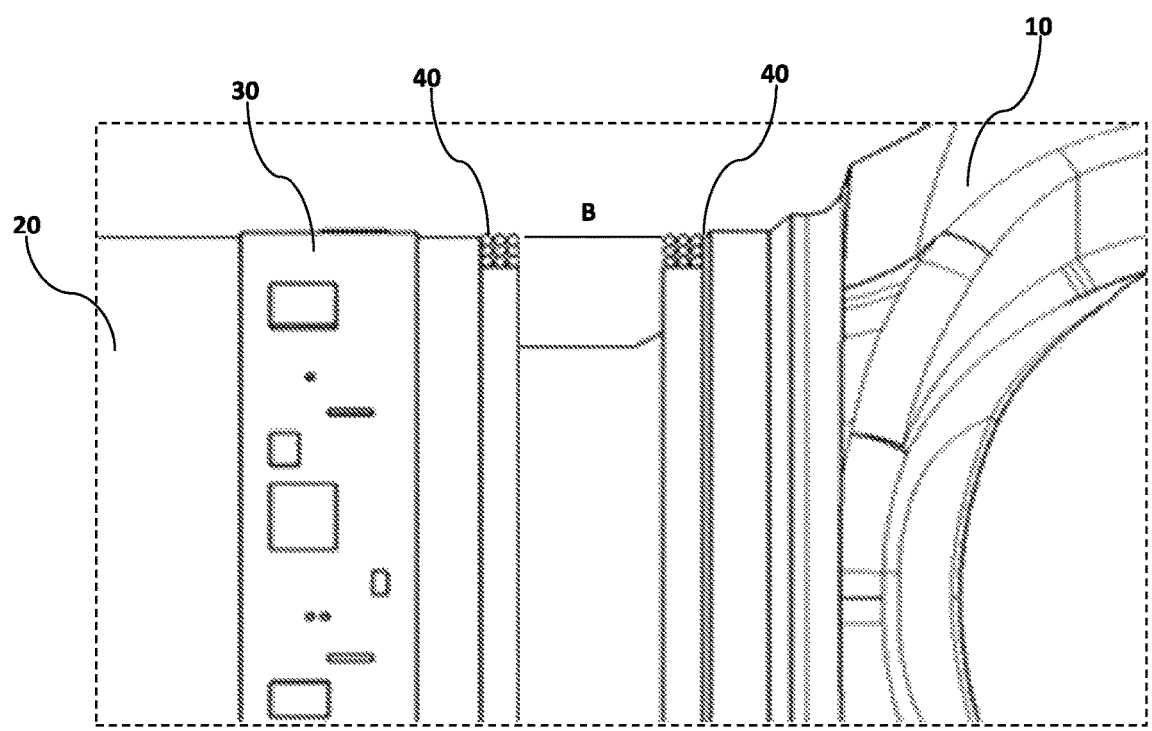
Figure 2.B
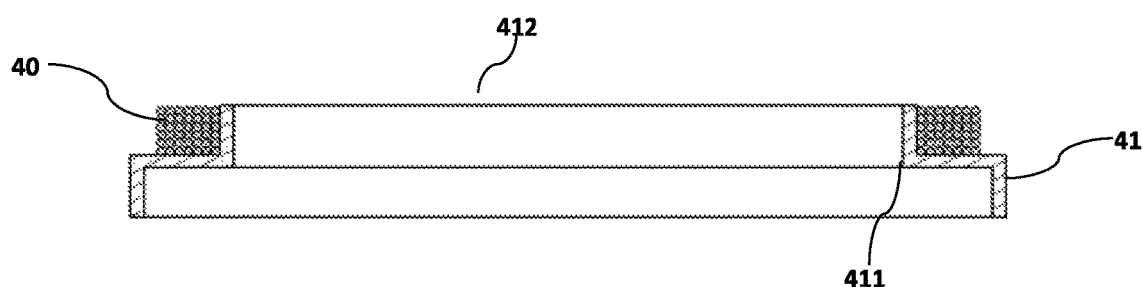
Figure 2.C

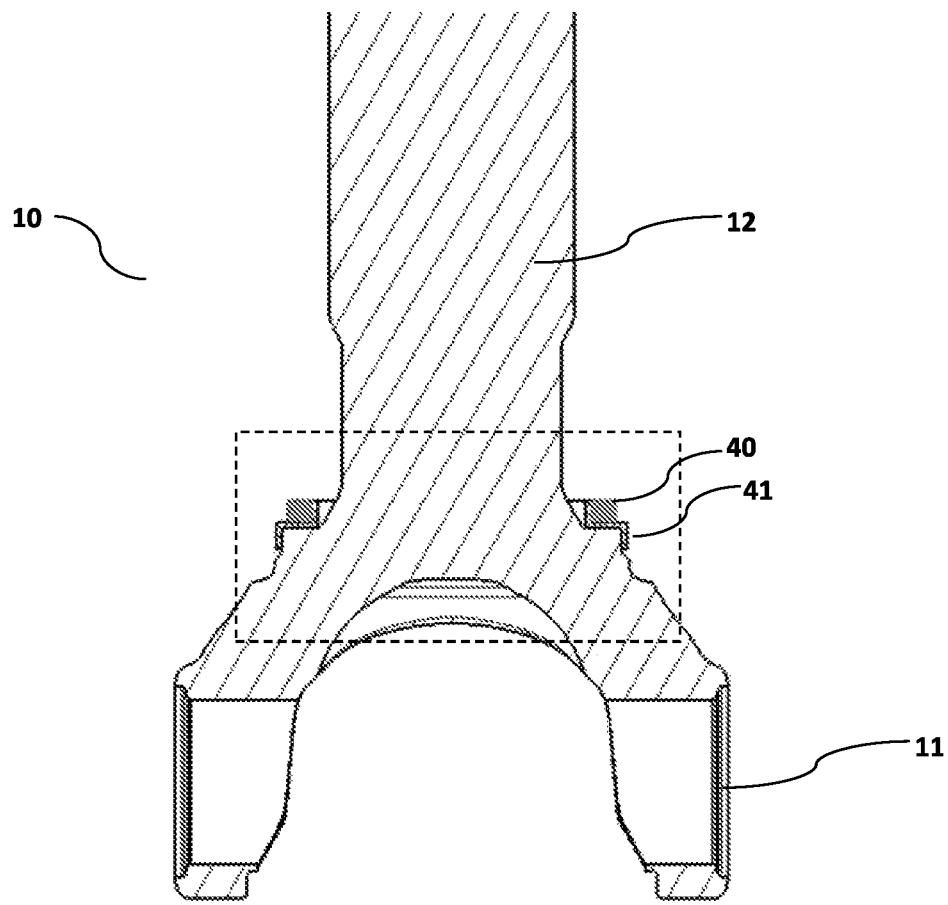
Figure 2.D
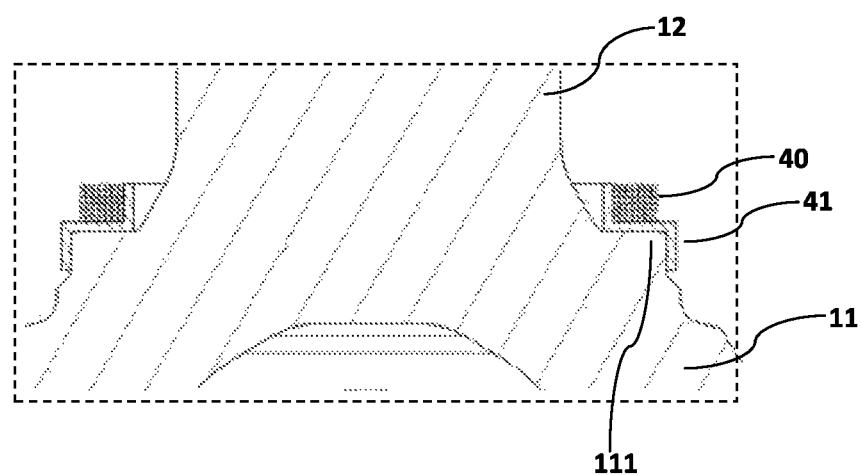
Figure 2.E

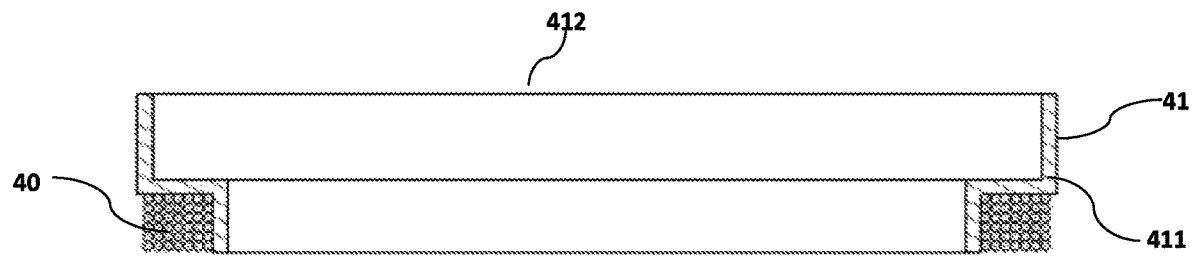
Figure 2.F
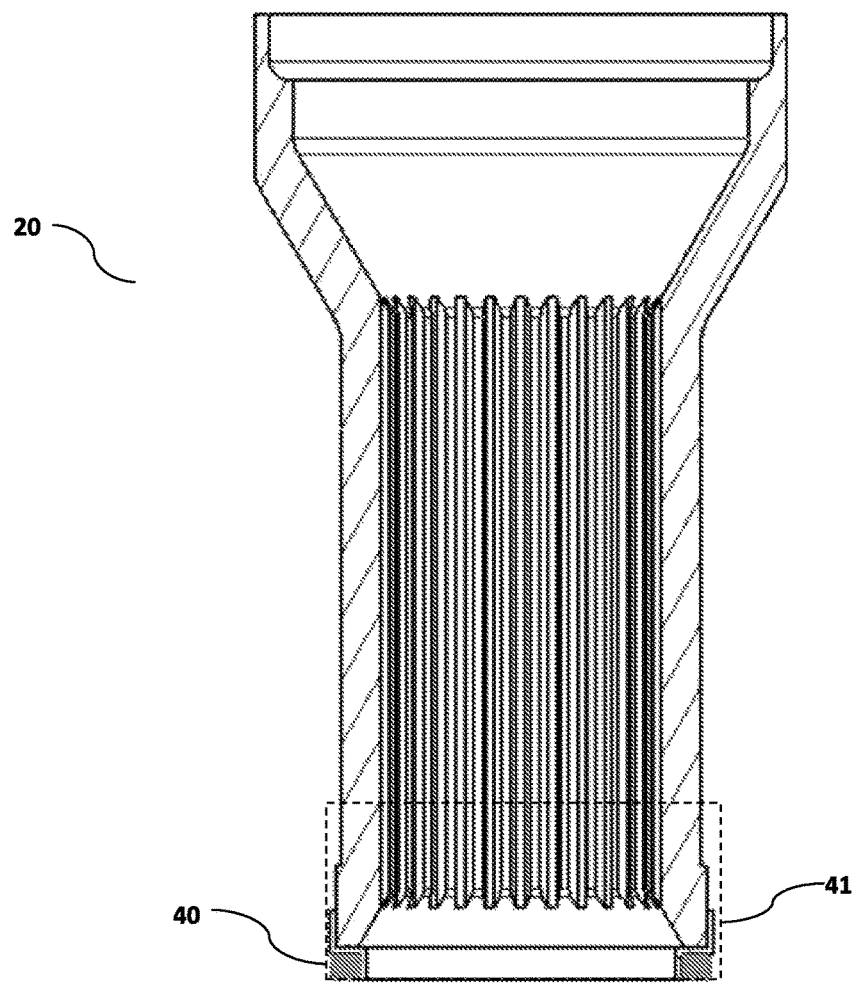
Figure 2.G

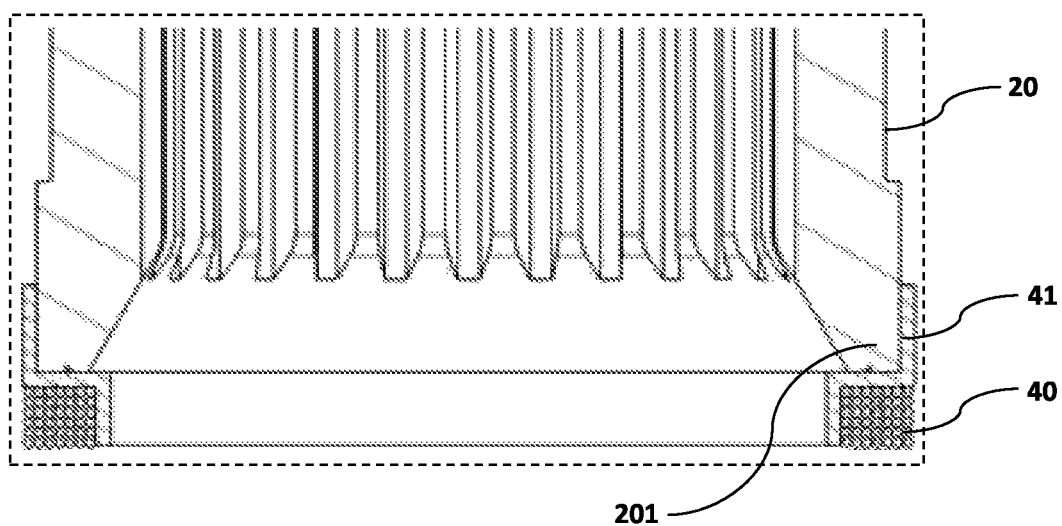
Figure 2.H

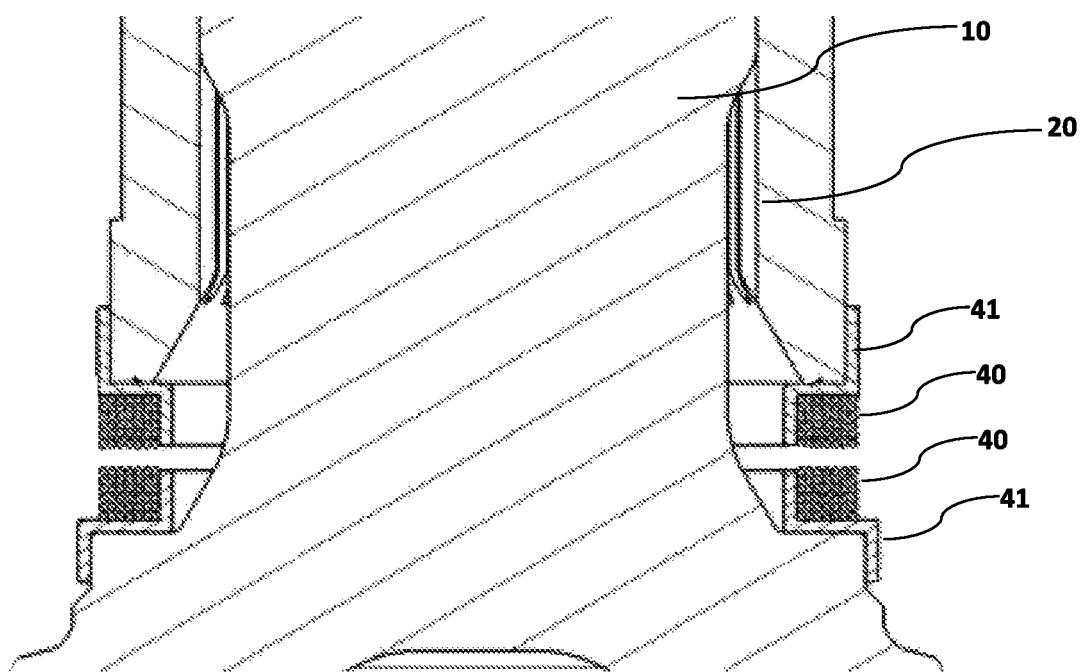
Figure 2.I

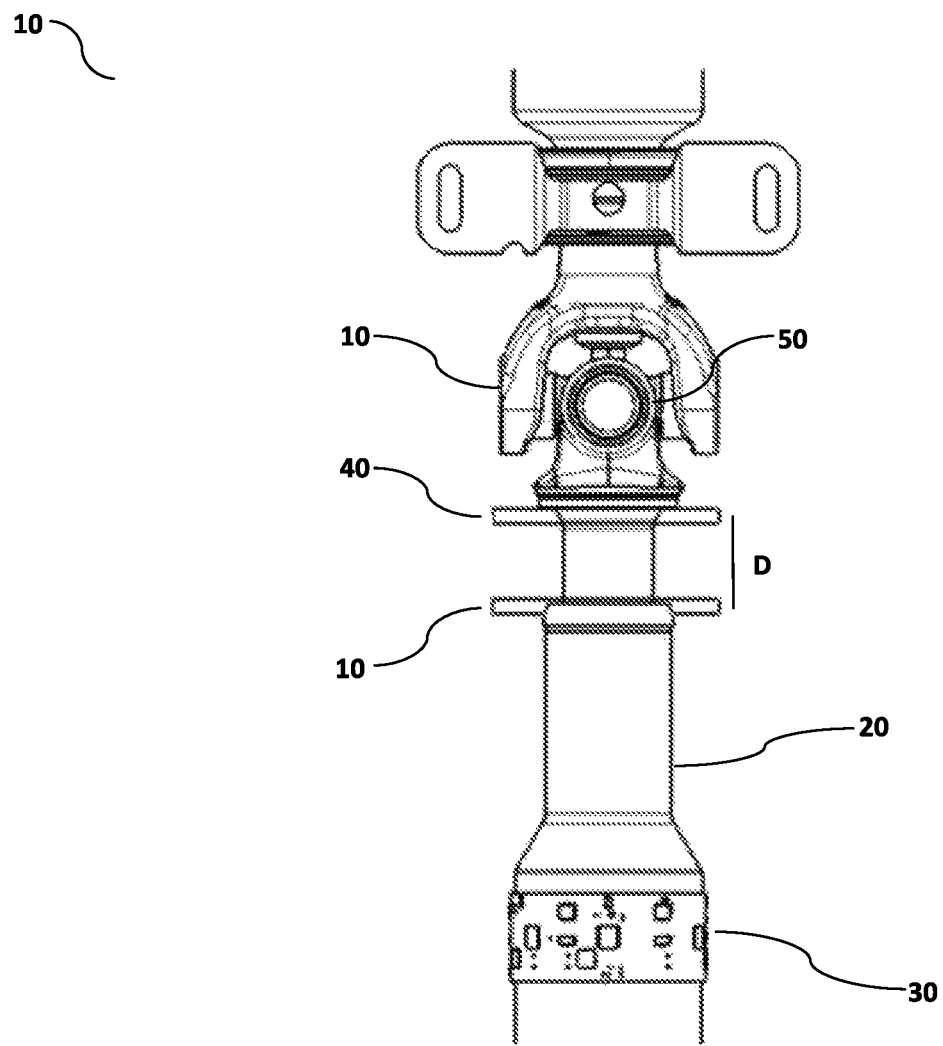
Figure 3.A

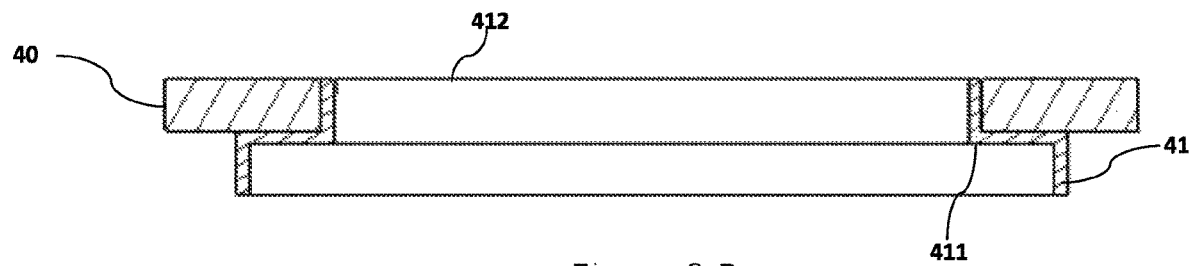
Figure 3.B
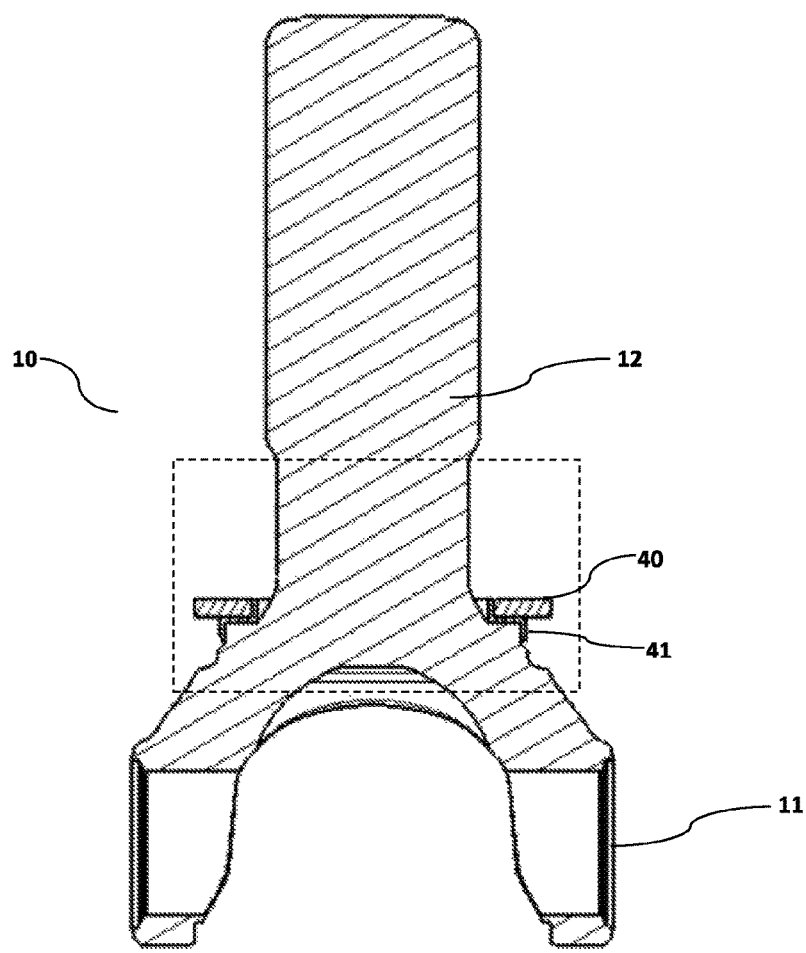
Figure 3.C

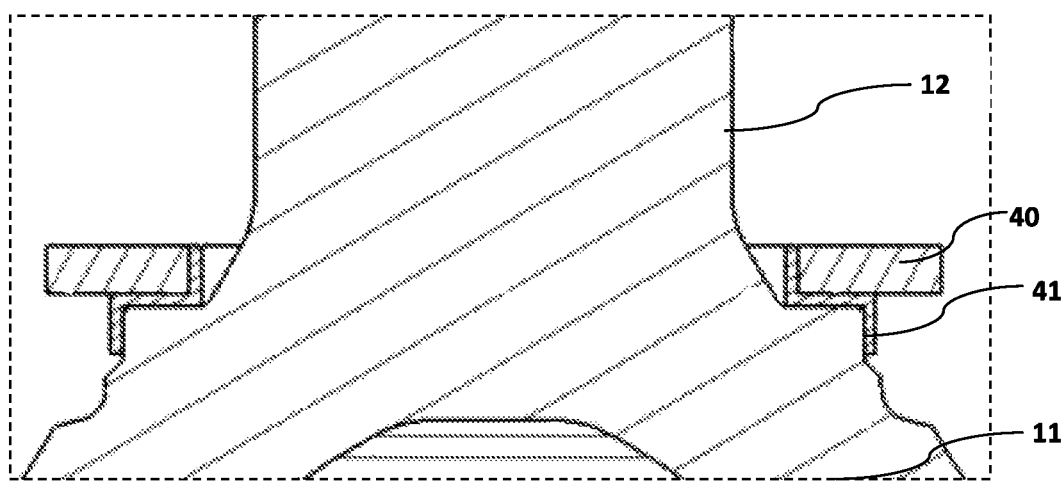
Figure 3.D

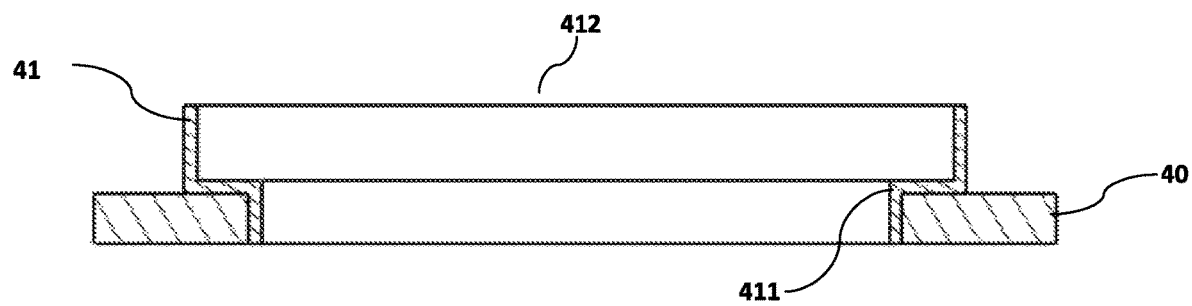
Figure 3.E
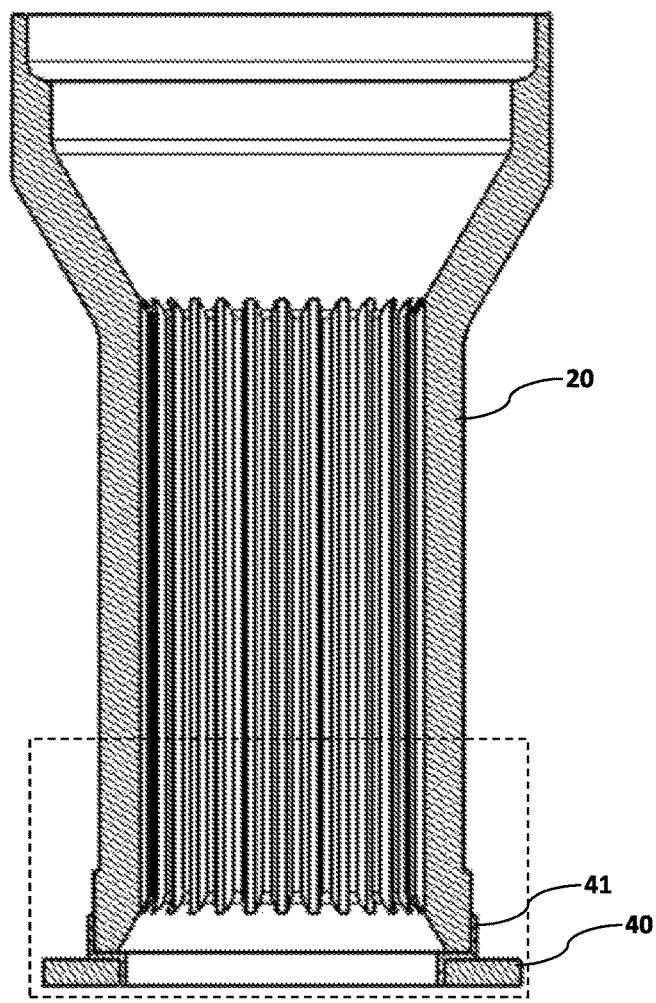
Figure 3.F

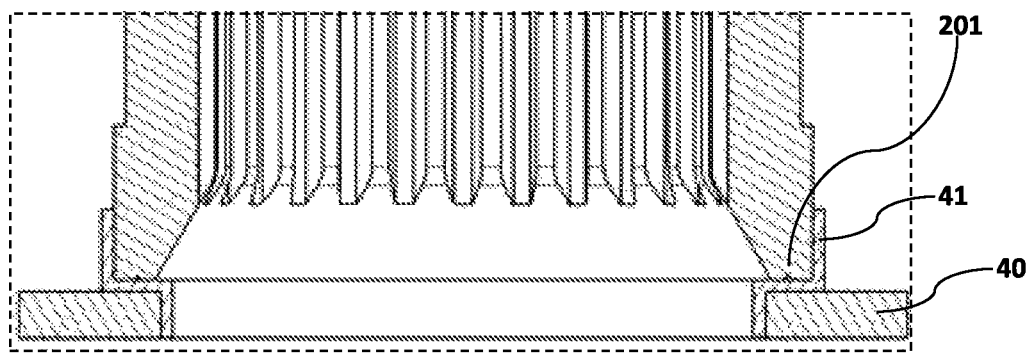
Figure 3.G
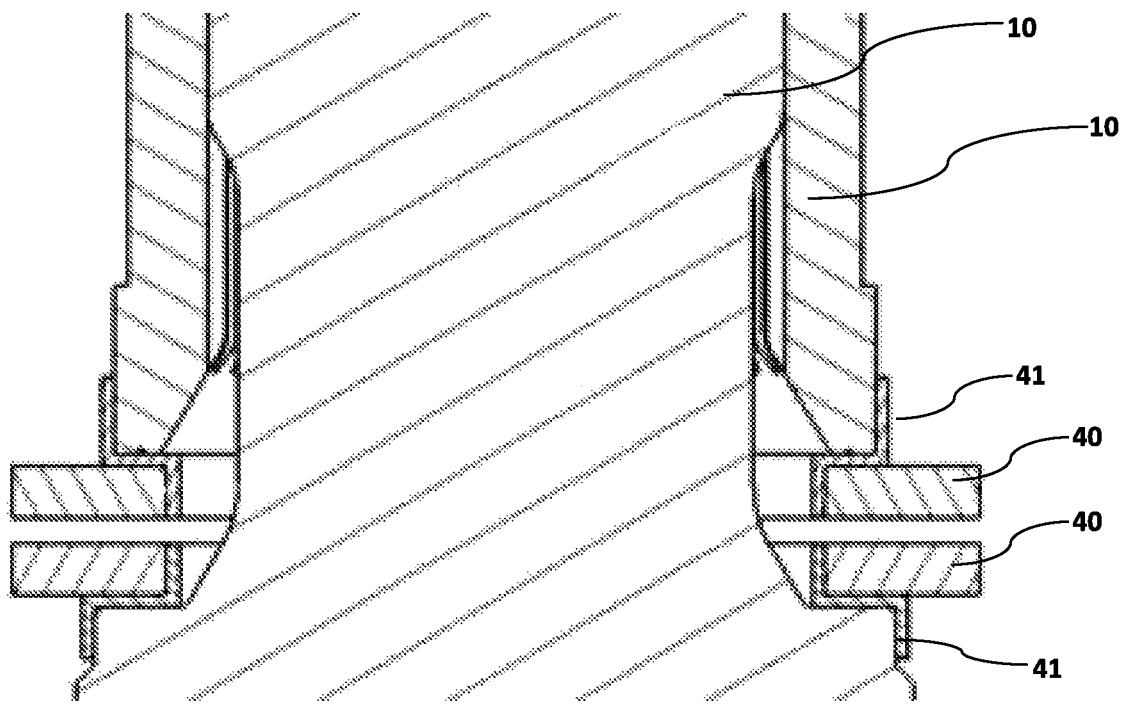
Figure 3.H

SYSTEM TO BE COUPLED TO A CARDAN SHAFT, RELATED CARDAN SHAFT AND OPERATION METHOD OF SAID SYSTEM

TECHNICAL FIELD

The invention relates to a system for determining the distance between the slip elements compensating axial displacements that occur along the cardan shaft caused by the vehicle axle movements, and to a cardan shaft of said system and a method related to said system.

PRIOR ART

Cardan shafts are the transfer elements which are used in motor vehicles to receive the rotational motion and power from the engine or transmission and to transmit said power to the differential of the vehicle. As a result of the movement of the vehicle axles depending on road conditions, the resulting distance between the differential and the motor or transmission varies. In addition to the pivoting motion, in order for the cardan shaft to perform its task, it must compensate for this variable distance and also continue its power transmission. The slip elements and the stationary elements are cardan shaft unit parts performing the length compensation in the cardan shaft. Preferably, the stationary element moves on the slip element to vary the length of the cardan shaft according to requirement and the amount of movement is determined by the slip distance of related elements.

The level of slip distance in a cardan shaft can vary depending on the type of vehicle, the loading status of the vehicle and the site conditions. Since the level of slip distance that has occurred, cannot be measured, the fully closed and fully open conditions are determined by design and a wide range is provided for the permissible slip distance. Since the suspension movements of a vehicle moving on the highway and an off-road are different according to the road conditions, the sliding movements along the axis of the cardan shaft are also different. As the axle movements of the vehicles moving on the highway does not have high amplitude, the slip distance is less than the off-road vehicles.

As stated, narrower slip distances may be sufficient for different vehicle types. If the displacement level of different vehicle types is known, this information can be used in designing different vehicle types to differentiate the slip distance according to vehicle type.

Considering the position of the cardan shaft on the vehicle, it is not possible to measure the distance and therefore the slip distance is generally determined by the predictions or simulations provided according to the conditions in which the vehicle shall be used, but the aforementioned methods are still not sufficient to fully reflect the field conditions.

The following document was encountered in the preliminary patent search.

In the French National Institute of Industrial Property document numbered FR2715468 (A1), an inductive position sensor integrated on the vehicle's suspension is described. The sensor consists of two coils and a power supply supplying power to at least one of the respective coils, and each of the coils is positioned in one of the moving parts of the body and the distance between related coils varies by means of the related moveable parts. The distance between the coils is obtained by comparing the signals at the ends of the receiver and the transmitter coils. The related structure is specifically designed for use on suspensions and only for axial movement suspension systems.

Another document numbered US 2017190359 (A1) describes a device and method for determining the direction and amount of movement of a steering wheel. One of the methods mentioned in this document is the monitoring the change in the amount of capacitance created between the two plates. In this embodiment, the area of the opposite faces changes together with the rotation of the steering wheel, and accordingly the amount of capacitance changes and the amount of rotation is determined via the respective electrical value.

As a result, all the problems mentioned above have necessitated a improvement to be provided in the relevant field.

AIM OF THE INVENTION

The present invention aims to eliminate the above-mentioned problems and to provide a technical innovation in the related field.

The main object of the invention is to provide a system which determines the distance difference amount and the distance between the components which compensate the distance difference amount created between the engine transmission, a cardan shaft of said system and the related method structure.

Another object of the invention is to determine the relative movements of a cardan shaft under real field conditions by utilizing the results of electrical interactions and/or related interactions, which vary by distance change between elements placed in different elements of the cardan shaft.

Another object of the invention is to provide an optimum design of the elements that are inserted in the cardan shaft in order to achieve the corresponding electrical interaction.

BRIEF DESCRIPTION OF THE INVENTION

The present invention which is provided in order to reach all of the aims mentioned above and which can be construed from the detailed description below, is a cardan shaft slip distance change detection system for determining the amount of length change of the cardan shaft, comprising a moveable element and a stationary element connected to each other in order to compensate the distance change caused by the vehicle's axle movements. Accordingly, it comprises at least two conductive elements configured as one of them connected to a fixed point, another to the moveable element, a power element to supply power to at least one of the conductive elements, a detection unit for measuring the electrical value change provided by the electrical interaction between the conductive elements and correlating it with the distance between the conductive elements.

In another preferred embodiment of the invention, the fixed point is said stationary element.

In another preferred embodiment of the invention, the fixed point is a center bearing comprised by the cardan shaft.

In another preferred embodiment of the invention, said conductive elements are plates.

In a preferred embodiment of the invention, said conductive plates are planar.

In another preferred embodiment of the invention, said detection unit is configured to be detect electrical values which is a capacitance value provided by the conductive elements and/or is changed by the relationship of said capacitance value.

In another preferred embodiment of the invention, said conductive elements are wires which are wounded around the moveable element and the stationary element.

In another preferred embodiment of the invention, said conductive elements are coils.

In a preferred embodiment of the invention, said detection unit is configured to be detect electrical values which is a current induced between said conductive elements and/or is changed by the relationship of said current values.

In another preferred embodiment of the invention, said power supply is configured to provide wireless power transmission.

Another preferred embodiment of the invention comprises said conductive element comprising at least one carrier element to provide mounting to the moveable element.

Another preferred embodiment of the invention comprises the conductive element comprising at least one carrier element to provide assembly to the stationary element.

Another preferred embodiment of the invention comprises at least one carrier element for providing the mounting of the conductive element to the center bearing.

In another preferred embodiment of the invention, said carrier element comprises at least one carrier element opening for engaging the end portion of said carrier element to the connection elements.

In another preferred embodiment of the invention, said carrier element is made of an insulating material.

In another preferred embodiment of the invention, said carrier element comprising at least two layers where the width the carrier element opening of one of the layers is wider than the other such that a mounting surface is formed for the conductive elements.

In order to reach all of the above mentioned objects and the objects that can be construed from the following detailed description, the present invention is a cardan shaft comprises a moveable element and a stationary element associated telescopically with each other, in order to compensate the change of the distance caused by the axle movements of the vehicle and a slip distance change detection system according to any of the preceding claims.

In another preferred embodiment of the invention, the conductive elements being connected to the corresponding surfaces of the moveable element and the stationary element.

In order to reach all of the above mentioned objects and the objects that can be construed from the following detailed description, the present invention is a cardan shaft slip distance change detection method for determining the amount of length difference in the cardan shaft comprising a moveable element and a stationary element associated with a telescopic approach to compensate for the change of distance caused by the vehicle's axle movements. Accordingly, the electrical value change caused by electrical interaction between at least two conductive elements, which is electrical power is applied one of them, which is one of the them is connected to said movable element and another is connected at a fixed point, is measured and correlating it with distance between the conductive elements.

In another preferred embodiment of the invention, the fixed point is said stationary element.

In another preferred embodiment of the invention, the fixed point is a center bearing (50) comprised by the cardan shaft.

In another preferred embodiment of the invention, said conductive elements are plates.

In another preferred embodiment of the invention, the capacitance values is provided by said conductive elements (40) and/or the electrical values changed by the relation of the capacitance value provided by said plates, is measured.

In another preferred embodiment of the invention, said conductive elements are wires which are wounded around the moveable element and the stationary element.

In another preferred embodiment of the invention, said conductive elements are coils.

In a preferred embodiment of the invention, measuring induced current or the electrical values which are changed by the interaction between the induced current.

BRIEF DESCRIPTION OF THE FIGURES

FIG. 1.A is a representative cross-sectional view of an embodiment in which the moveable element is selected as a slip yoke shaft.

FIG. 1.B is a representative cross-sectional view of an embodiment in which the stationary element is selected as a tube sleeve.

FIG. 1.C is a representative sectional view of an embodiment of the structure of the moveable and stationary elements that are respectively selected as slip yoke shaft and tube sleeve.

FIG. 1.D is a representative sectional view of an embodiment of the structure of the moveable and stationary elements that are respectively selected as slip stub and sleeve yoke.

FIG. 1.E is a representative sectional view of an embodiment of the structure of the moveable and stationary elements that are respectively selected as the slip yoke shaft and sleeve yoke.

FIG. 2.A illustrates a detailed view of a position of the contact zone of the stationary element and the moveable element shown in FIG. 2.

FIG. 2.B illustrates a detailed view of another position of the contact zone of the stationary element and the moveable element shown in FIG. 2.

FIG. 2.C illustrates a cross-sectional view of an embodiment of a carrier element.

FIG. 2.D. is a cross-sectional view of an embodiment of a moveable element assembled with a carrier element.

In FIG. 2.E is a detail section view of the assembling area illustrated in FIG. 2.D.

FIG. 2.F is a cross-sectional view of an embodiment of a carrier element.

FIG. 2.G is a representative cross-sectional front view of an embodiment of a stationary element which is assembled with a carrying plate.

FIG. 2.H illustrates a detailed sectional view of the assembling area in FIG. 2.G.

FIG. 2.I is a representative cross-sectional view from the front view of embodiment of the cardan shaft assembled with the carrying plate.

FIG. 3.A illustrates another position of the embodiment illustrated in FIG. 3.

FIG. 3.B is a sectional front view of an embodiment of a carrier element.

FIG. 3.C is a cross-sectional front view of an embodiment of a moveable element assembled with the carrier element.

FIG. 3.D illustrates a detailed sectional view of the assembling area in FIG. 3.C.

FIG. 3.E is a representative cross-sectional front view of an embodiment of a carrier element.

FIG. 3.F illustrates a representative cross-sectional front view of an embodiment of a stationary element which is assembled with a carrying plate.

FIG. 3.G illustrates a detailed sectional view of the assembling area in FIG. 3.F.

FIG. 3.H illustrates a representative cross-sectional front view of an embodiment of the cardan shaft assembled with the carrying plate.

DESCRIPTION OF THE REFERENCE NUMBERS OF THE FIGURES

Figure 1:
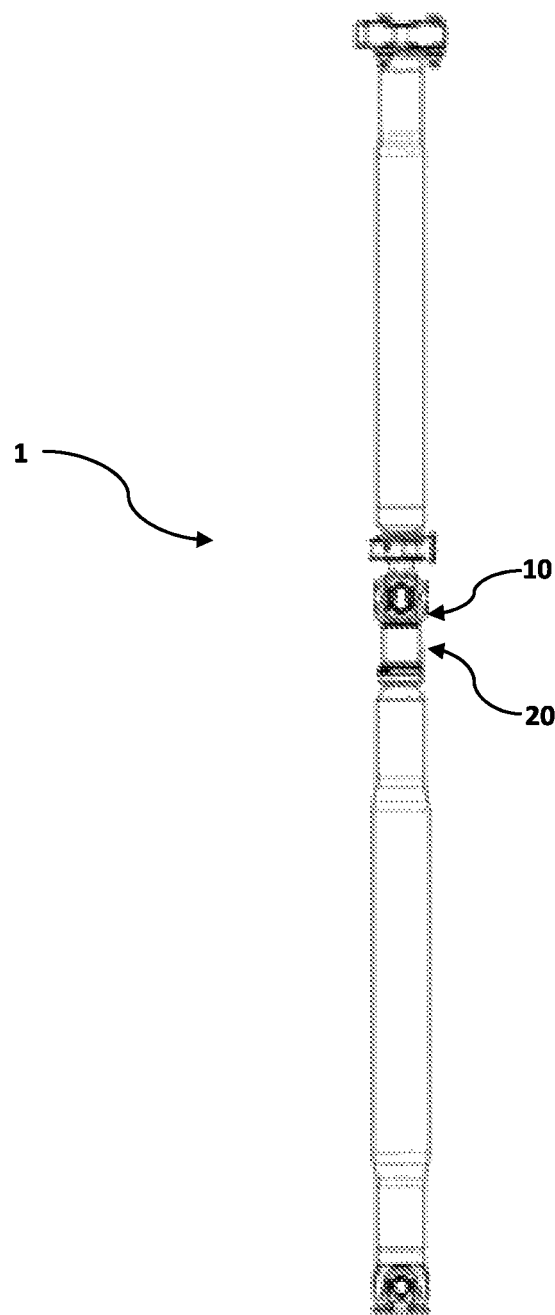
FIG. 1 illustrates a front view of a cardan shaft.

1. Cardan shaft
10. Moveable element
11. Yoke
111. Support
12. Shaft
20. Stationary element
201. Stationary element support
21. Housing
211. Aperture
30. Detection unit
40. Conductive element
41. Carrier element
411. Carrier element support
412. Carrier element opening
50. Center bearing
60. Cross

DETAILED DESCRIPTION OF THE INVENTION

In this detailed description, a system for connecting to a cardan shaft (1) of the invention, the associated cardan shaft (1) and the method of operation of the respective system are explained only by illustrative examples which will have no limiting effect but have been provided for a better understanding of the subject.

The invention relates to a system for determining the amount of change in distance and distance between the components of the cardan shaft (1), between the engine transmission assembly and the differential, the amount of offset between the transmission group and the differential, a cardan shaft (1) with the related system and a related method.

The invention relates to cardan shaft (1) slip distance change detection system for determining the amount of length change of the cardan shaft (1), comprising a moveable element (10) and a stationary element (20) associated with a telescopic approach to compensate for the change of distance caused by the vehicle's axle movements, characterized by comprising;

at least two conductive (40) elements configured as one of them connected to a fixed point, another to the moveable element (10), a power element to supply power to at least one of the conductive elements (40), a detection unit (30) for measuring the electrical value change provided by the electrical interaction between the conductive elements (40) and correlating it with the distance between the conductive elements (40).

Hereby, term of the "distance" expression is defined by the length of the shaft-sleeve relationship between the moveable element (10) and the stationary element (20), term of the "telescopic" expression defines the structure of the cardan shaft (1), which enables the change of the length of the cardan shaft (1) by the shaft-sleeve relationship between the moveable element (10) and the stationary element (20). Furthermore, term of the "detection unit" (30) expression refers to structures comprising at least one electronic circuit capable of detecting change of electrical interaction caused by change of distance between mentioned conductive elements (40), by using certain measurement methods.

In FIG. 1, a cardan shaft (1) configuration and in FIG. 1 A-C the moveable element (20) and stationary element (30), which are the basic elements of the cardan shaft (1), are illustrated. In the embodiment illustrated in FIG. 1-1.B, the length variation provided by the cardan shaft (1) to compensate the movement of the vehicle is provided by the shaft (12) part of the moveable element (10), the stationary element (20) inserted into the housing (21) from the opening (211), and mentioned relationship is provided by the vertical movement of the shaft (12) in the housing (21). In this embodiment, the moveable and stationary elements (10, 20) are selected as slip yoke shaft and tube sleeve, respectively.

Said moveable and stationary elements (10, 20) should not be restricted to FIG. 1-1.C. FIGS. 1.D and 1.E illustrate the embodiments and interconnections between. In the section illustrated in FIG. 1.D, the moveable element (10) is selected as the slip stub and the stationary element (20) as the tube yoke. In this embodiment, yoke shaft is in the form of a sleeve and the slip stub moves in the mentioned sleeve structure. In the section illustrated in FIG. 1.E, the moveable element (10) is selected as tube yoke and the stationary element (20) as sleeve yoke. In this embodiment, again, yoke shaft is in the form of a tube and the yoke shaft moves in the mentioned sleeve structure. The types of the cardan shaft (1) can be varied with mentioned basic elements (10, 20), although the limiting feature associated with mentioned cardan shaft (1) is that the moveable and stationary elements (10, 20) exhibit telescopic features.

Figure 2:
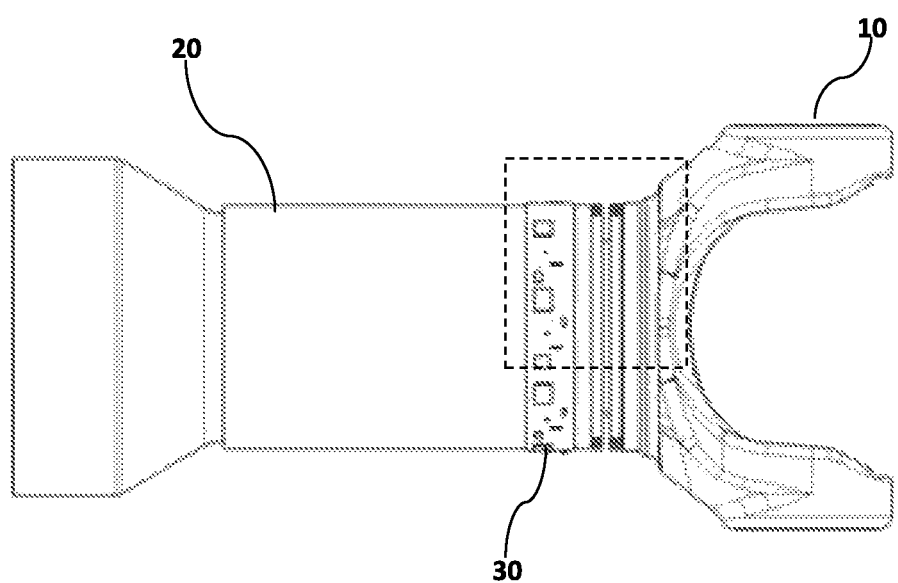
FIG. 2 is a representative front view of an embodiment of a cardan shaft with a distance determining system.
Figure 3:
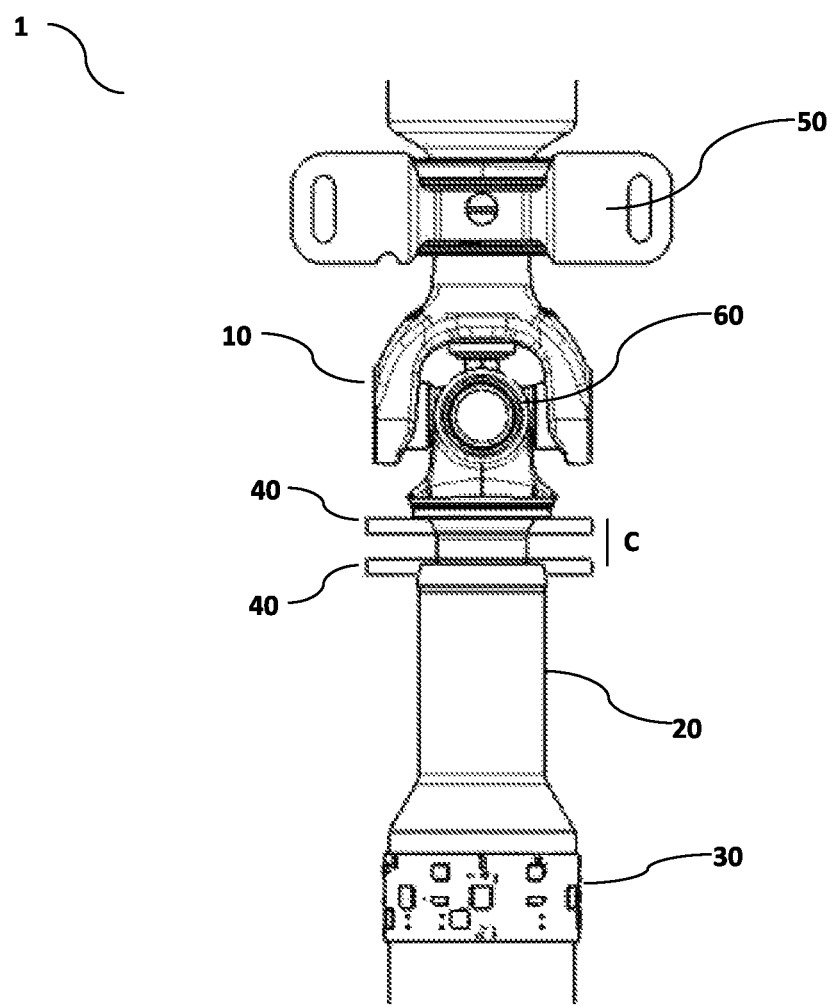
FIG. 3 illustrates a representative front view of an embodiment of the cardan shaft according to the invention.

The embodiments illustrated in FIGS. 2-3.H are described with the structure in which the moveable and stationary element (10, 20) is selected as a slip yoke shaft and tube sleeve for better understanding of the subject, but this structure is not to be construed as limiting and as described above, it is obvious that said moveable and stationary elements (10, 20) and the like can be applied to the subject matter of the invention.

FIG. 2-2.I illustrates a configuration and alternatives in which inductive interaction between the mentioned conductive elements (40) is provided. In this embodiment, one of the conductive elements (40) is positioned on the opposite faces of the moveable element (10) and the other on the stationary element (20). Hereby, the conductive elements (40) may be coils or wires that are wound to the moveable element (10) and the other to the stationary element (20) to provide the inductive interference effect. Hereby, one of the conductive elements (40) induces current on another. At least one conductive element (40) is supplied by a power supply (not shown in the figures) to provide mentioned interference. Preferably, the power supply is configured to transmit power wirelessly.

In FIG. 2.A, the conductive elements (40) are shown as wound wires, with a distance "A", between the wound wires. In FIG. 2.B, with the movement of the moveable element (10), the distance is reached to "B". The distance "B" is greater than the distance "A". As the distance between the two conductive elements (40) increases, the interference and the corresponding transmitted power and similar electrical values decrease, as the distance decreases, the interference and consequently the transmitted power and similar electrical values increase.

In a preferred embodiment of the invention, the coil or wound wires are positioned or wound to provide an inductive interference effect on a carrier element (41). In the embodiment illustrated in FIG. 2.C, wound wires are shown. The carrier element (41) shown in FIG. 2.C is configured to be able to be assembled on the moveable element (10), in particular, in the area where the yoke (11) portion and the shaft (12) portion engage.

The carrier element (41) comprises a shell and a carrier element opening (412). The carrier element (41) is comprised of two layers and the carriage member opening (412) has a width greater than the other. The layer having a wider carrier element opening (412) allows the carrying member (41) to pass to the yoke (11) portion, while the layer having the narrower carrier element opening (412) allows the conveying member (41) to enclose the shaft (12) portion forming a positioning surface for the conductive element (40). This layered structure enables the formation of a carrier element support (411) on the carrier element (41). Said carrier element support (411) is compatible with the support (111) formed at the point where it joins the shaft (12) of the yoke (11), as shown in FIG. 2.E. Said assembling structure can be seen in FIGS. 2.D and 2.E.

In the embodiment shown in FIG. 2.F, wound wires are shown. The carrying member (41) illustrated in FIG. 2.F is configured to be assembled on the stationary element (20), in particular, in the portion of the opening (211). The shaft (12) portion of the moveable element (10) passes through the opening (412) portion of mentioned carrier element (41) and enters the housing (21).

The carrier element (41) comprises a shell and a carrier element opening (412). The carrier element (41) is comprised of two layers and the carrier element opening (412) of one of these layers has a width greater than the other. The layer having the wider carrier element opening (412) allowing the carrier element (41) to engage the stationary element (20) to the shell, while the layer having the narrower carrier element opening (412) provides the carrier element (41) to enclose the portion of the opening (211) and a positioning surface for the conductive element (40). This layered structure enables the formation of a carrier element support (411) on the carrier element (41). Said carrier element support (411) is compatible with the stationary element support (201) formed in the opening (211), as shown in FIG. 2.H. Said mounting structure can be seen in FIGS. 2.G and 2.H.

The carrier elements (41) may be positioned on at least on the fixed member (20) and or the moveable element (10), but preferably a carrier element (41, 41) is placed on both the stationary element (20) and the moveable element (10), as illustrated in the embodiment shown in FIG. 2.I.

The carrier elements (41) are preferably made of insulating material. Accordingly, the carrier element (41) becomes an electrically isolated structure from the rest of the cardan shaft.

While said detection unit (30) is preferably located on the stationary element (20), said position is not restrictive. The detection unit (30) maintains its function in an equal manner within different positions. In the embodiments of FIG. 2, the detection unit (30) is configured to measure and/or detect the induced current and/or other electrical values which are induced between the conductive elements in order to determine the inductive interaction. Said structure may comprise a memory unit for storing the data obtained and/or cable or wireless transmission units known in the art for transmitting the data to an external memory unit.

In FIG. 3-3.H, a configuration and alternatives thereof are illustrated in which said conductive elements (40) provide capacitive interaction between them. In this embodiment, one of the conductive elements (40) is positioned on the opposite faces of the moveable element (10) and the other on the stationary element (20). In this embodiment, the conductive elements (40) are plates, preferably planar plates. Hereby, the interaction between the conductive elements (40) creates a capacitive effect. The conductive elements (40) are supplied by a power supply (not shown in the figures) to provide mentioned interference. Preferably, the power supply is configured to transmit power wirelessly.

In FIG. 3, there is a distance "C" between the conductive elements (40). In FIG. 3A, the distance to the "D" value is reached by the movement of the moveable element (10). The distance "C" is greater than the distance "D". As the distance between the two conductive elements "40" increases, the capacitance and thus the total load and similar electrical values decrease, as the distance decreases, the capacitance and consequently the total load and the like electrical values increase.

In a preferred embodiment of the invention, the plates are positioned on the carrying member (41) to provide capacitance change. The carrier element (41) illustrated in FIG. 3.B is configured to be assembled to the moveable element (10), in particular, in the region where the portion of the yoke (11) and the shaft (12) are joined.

The carrier element (41) comprises a shell and a carrier element opening (412). The carrier element (41) is composed of double layers and the width of the sections of the carrier element opening (412) is greater than the other. The layer having the wider carrier element opening (412) allows the carrier member (41) to pass to the yoke portion (11), while the layer having the narrower carrier element opening (412) allows the carrier element (41) to enclose the shaft (12) portion forming a positioning surface for the conductive element (40). This layered structure enables the formation of a carrier element support (411) on the carrier element (41). Mentioned carrier element support (411) is compatible with the support (111) formed at the point where it joins the shaft (12) of the yoke (11), as shown in FIG. 3.D. Said mounting structure can be seen in FIGS. 3C and 3.D.

The carrier element (41) illustrated in FIG. 3.E is configured to be assembled on the stationary member (20), in particular, on the portion of the opening (211). The shaft (12) portion of the moveable element (10) passes through the opening (412) portion of said carrier element (41) and enters the housing (21).

The carrier element (41) comprises a shell and a carrier element opening (412). The carrier element (41) consists of two layers and one of these layers is larger than the width of the support element opening (412). The layer having the wider carrier element opening (412) allows the carrier element (41) to engage the stationary element (20) to the shell portion while the layer having the narrower carrier element opening (412) provides the carrier element (41) with the portion of the opening (211) sealed therein. It forms a positioning surface for the conductive element (40). This layered structure enables the formation of a carrier element support (411) on the carrier element (41). Said carrier element support (411) is compatible with the stationary element support (201) formed in the opening (211), as illustrated in FIG. 3.G. Said assembling structure can be seen in FIGS. 3.F and 3.G.

The carrier elements (41) may be positioned on at least one of the stationary element (20) and the moveable element (10), but preferably, there are carrier elements (41) on both the stationary element (20) and the moveable element (10) as in the embodiment illustrated in FIG. 3.H.

While the aforementioned detection unit (30) is preferably disposed on the stationary element (20), said position is not restrictive. The detection unit (30) maintains its function in an equivalent manner within different positions.

In the embodiments of FIG. 3-3.H, the detection unit (30) is configured to measure and/or detect capacitance and/or other electrical values which are provided between the conductive elements in order to determine the capacitive interaction. Said structure may comprise a memory unit for storing the data obtained and/or cable or wireless transmission units known in the art for transmitting the data to an external memory unit.

The invention relates to a cardan shaft (1), comprising a slip distance change detection device, and a moveable element (10) and a stationary element (20) associated with a telescopic approach to each other to compensate for the change of distance caused by the vehicle's axle movements according to any of the embodiments set forth in the foregoing and the claims.

In said cardan shaft (1), the elements of said slip distance change detection system are integrated to the cardan shaft (1).

In another preferred embodiment of the invention, the cardan shaft (1) comprises a center bearing (50). The center bearing (50) is a structure having a ball bearing in the middle in order to provide the necessary support and to provide coupling of the cardan shafts (1) to the chassis on the vehicle. The embodiment according to the invention can also be used as a fixed point in which the center bearing (50) is positioned in the conductive elements (40). Said center bearing (50) can be seen in FIGS. 3 and 3A.

It has been noted that the power supply of the cardan shaft (1) detection system and a cardan shaft (1) of the system can be wireless. Hereby, the structure described in the utility model of the relevant wireless transmission which is disclosed in document with TR2017/08500 application number can be used.

A cardan shaft (1) slip distance change detection method for determining the amount of length difference in the cardan shaft (1) comprising a moveable element (10) and a stationary element (20) associated with a telescopic approach to compensate for the change of distance caused by the vehicle's axle movements, characterized in that; measuring the electrical value change caused by electrical interaction between at least two conductive elements (40), which is electrical power is applied one of them, which is one of the them is connected to said movable element (10) and another is connected at a fixed point, and correlating it with distance between the conductive elements (40).

Said conductive elements (40) may be selected from the coil, wound wire or plates, as in the system and the cardan shaft mentioned above. The coil and the wound wire provide inductive electrical interference, while the plates provide capacitive electrical interference. Within the method, the electrical values measured by the relation of the capacitance value provided by mentioned plates and/or by the relation of said capacitance value are measured, and the electrical values varying between mentioned inductors and the relationship of mentioned are measured.

The scope of protection of the invention is set forth in the attached claims and said scope cannot be limited to the embodiments described in the detailed description. Therefore it is obvious that a skilled person in the art can provide similar embodiments in the light of the foregoing without departing from the main theme of the invention.

The invention claimed is:

1. A cardan shaft slip distance change detection system for determining the amount of length change of the cardan shaft, comprising a moveable element and a stationary element associated with a telescopic approach to compensate for the change of distance caused by the vehicle's axle movements, characterized by comprising:
    at least two conductive elements configured as one of them connected to a fixed point, another to the moveable element, a power element to supply power to at least one of the conductive elements, a detection unit for measuring the electrical value change provided by the electrical interaction between the conductive elements and correlating it with the distance between the conductive elements.

2. A cardan shaft slip distance change detection system according to claim 1, characterized by said conductive elements are plates.

3. A cardan shaft slip distance change detection system according to claim 2, characterized by said detection unit is configured to be detect electrical values which is a capacitance value provided by the conductive elements and/or is changed by the relationship of said capacitance value.

4. A cardan shaft slip distance change detection system according to claim 1, wherein said conductive elements are coils.

5. A cardan shaft slip distance change detection system according to claim 4, wherein said detection unit is configured to be detect electrical values which is a current induced between said conductive elements and/or is changed by the relationship of said current values.

6. A cardan shaft slip distance change detection system according to claim 1, said conductive element comprising at least one carrier element to provide mounting to the moveable element.

7. A cardan shaft slip distance change detection system according to claim 1, said conductive element comprising at least one carrier element to provide assembly to the stationary element.

8. A cardan shaft slip distance change detection system according to claim 1, said conductive element comprising at least one carrier element to provide assembly to the center bearing.

9. A cardan shaft slip distance change detection system according to claim 6, wherein said carrier element is made of an insulating material.

10. A cardan shaft comprises a moveable element and a stationary element associated telescopically with each other, in order to compensate the change of the distance caused by the axle movements of the vehicle and a slip distance change detection system according to claim 1.

11. A cardan shaft slip distance change detection method for determining the amount of length difference in the cardan shaft comprising a moveable element and a stationary element associated with a telescopic approach to compensate for the change of distance caused by the vehicle's axle movements, characterized in that: measuring the electrical value change caused by electrical interaction between at least two conductive elements, which is electrical power is applied one of them, which is one of the them is connected to said movable element and another is connected at a fixed point, and correlating it with distance between the conductive elements.

12. A cardan shaft slip distance change detection method according to claim 11, wherein said conductive elements are plates.

13. A cardan shaft slip distance change detection method according to claim 12, characterized by measuring the capacitance values is provided by said conductive elements and/or the electrical values changed by the relation of the capacitance value provided by said plates.

14. A cardan shaft slip distance change detection method according to claim 11, wherein said conductive elements are wires which are wound around the moveable element and the stationary element.

15. A cardan shaft slip distance change detection method according to claim 14, characterized by measuring induced current or the electrical values which are changed by the interaction between the induced current.

* * * * *